United States Patent

(12) United States Patent
Malins

(10) Patent No.: US 9,816,288 B2
(45) Date of Patent: Nov. 14, 2017

(54) BRACKET AND METHOD OF USING SAME

(71) Applicant: GALLAGHER GROUP LIMITED, Hamilton (NZ)

(72) Inventor: Craig David Malins, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 0 days.

(21) Appl. No.: 14/905,844

(22) PCT Filed: Jun. 26, 2014

(86) PCT No.: PCT/NZ2014/000129
§ 371 (c)(1),
(2) Date: Jan. 18, 2016

(87) PCT Pub. No.: WO2015/009165
PCT Pub. Date: Jan. 22, 2015

(65) Prior Publication Data
US 2016/0160524 A1 Jun. 9, 2016

(30) Foreign Application Priority Data

Jul. 17, 2013 (NZ) ...................................... 613316

(51) Int. Cl.
| F16L 3/08 | (2006.01) |
| E04H 17/10 | (2006.01) |
| A01K 3/00 | (2006.01) |
| F16B 2/06 | (2006.01) |
| F16M 13/02 | (2006.01) |

(52) U.S. Cl.
CPC ................ *E04H 17/10* (2013.01); *A01K 3/00* (2013.01); *A01K 3/005* (2013.01); *F16B 2/065* (2013.01); *F16M 13/02* (2013.01)

(58) Field of Classification Search
CPC .......... E01F 15/06; Y10T 24/445; F16B 2/00; E04K 17/10; A01K 3/00
See application file for complete search history.

(56) References Cited

U.S. PATENT DOCUMENTS

| 1,625,716 A | * | 4/1927 | Edwards ................. E01F 15/06 174/45 R |
| 4,738,050 A | | 4/1988 | Dickinson |
| 9,234,367 B2 | * | 1/2016 | Kopp ..................... E04H 17/12 |
| 2010/0247266 A1 | * | 9/2010 | Staniszewski ........ F16B 39/126 411/201 |

FOREIGN PATENT DOCUMENTS

JP 11159098 6/1999

* cited by examiner

*Primary Examiner* — Amy Sterling
(74) *Attorney, Agent, or Firm* — Gable Gotwals

(57) ABSTRACT

This invention relates to a mounting bracket including a body configured to engage with at least a part of a structure, the body includes an aperture for a fastener; a securing mechanism to secure the bracket to the structure; the securing mechanism includes a first and second fastener, the fasteners configured to engage with each other, the second fastener also engages with a second aperture of the body, the second fastener and second aperture includes a complementary guide and track in the form of a co-operating helical screw thread.

17 Claims, 4 Drawing Sheets

BRACKET AND METHOD OF USING SAME

CROSS-REFERENCE TO RELATED APPLICATIONS

This application is the United States National Phase of PCT Patent Application No. PCT/NZ2014/000129 filed 26 Jun. 2014, which claims priority to New Zealand Patent Application No. 613316 filed 17 Jul. 2013, each of which is incorporated herein by reference.

TECHNICAL FIELD

This invention relates to a mounting bracket and a method of securing the bracket to a post or the like. The invention has particular application to the mounting of fencing wire and/or accessories to posts used in the fencing industry. However, this is not meant to be limiting, and the invention may have applications in other industries.

BACKGROUND ART

The use of electric fencing, where an electrical current is applied to a fence line to deliver an electric shock to any objects that come in contact with it, is common in a number of industries. Electric fencing is especially useful for the use of controlling movement of livestock.

Typically, electric fencing is set up by having a plurality of posts along a fence line with fencing wire connecting the posts. This fencing wire is secured to the posts using brackets and tensioners to keep the fence taut. The fencing wire is also conductively connected to energisers which provide the electrical current passing through the wire.

A number of variations of the electric fence have been developed, and one such variation is the electric fence tape or wire commonly known as polywire. This was developed so that a temporary electric barrier can be created without having to set up a permanent post or fence line. Instead, fencing standards in conjunction with polywire may be used to establish the electric fence.

As a result, there are a wide range of products, such as connectors and brackets, available to allow the user to securely, safely, and quickly attach fencing wire and other accessories (such as energisers, insulators, wire strainers and the like) to posts, fencing standards or any other object to which the fencing wire is to be secured.

However, there are a number of common problems associated with these products.

Firstly, it can be tedious and time consuming to secure fencing wire to the fencing posts due to the mechanism and structure of existing connectors and brackets. Therefore, it is vital for the connectors and brackets to be user friendly and not laborious to use in the field.

Secondly, in many cases the fencing wire has to be connected at various different angles to the posts. Many existing products do not allow for such variations in the angle of connection between the fence wires and the posts.

Thirdly, many existing products are not tamper-proof. Connectors or brackets can be easily tampered with by people or animals either deliberately or accidentally, which can be a particular issue when the fence is being used for security reasons. Deliberate or inadvertent tampering may create a loose connection between the fencing wire and the posts. This can affect the conductivity of the fence line, and should an animal contact the fencing wire, an electric shock or an alarm signal may not result.

Fourthly, there is a need for connectors and brackets which can be used to securely connect fencing wire to fencing posts of differing dimensions and configurations.

Of particular importance is the preference for connectors and brackets to securely connect the fencing wire to the posts with little or no distortion of the wire. It is also desirable that the connectors or brackets have a firm connection to the post so the connection stays relatively robust even in extreme weather conditions and inadvertent contact with the connectors and brackets.

Given the simplicity of electric fencing technology and related equipment, any improvements which lead to operational advantages such as reduction in the time and effort required to establish a robust fencing line are considered to be particularly advantageous.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a mounting bracket, the bracket including:
a body, wherein the body is configured to engage with at least a part of a structure, and wherein the body includes an aperture for a fastener;
a securing mechanism to secure the bracket to the structure; characterised in that
the securing mechanism includes a first and second fastener, wherein the fasteners are configured to engage with each other, wherein the second fastener is also configured to engage with a second aperture of the body, wherein the second fastener and aperture includes a complementary guide and track.

According to another aspect of the present invention there is provided a method of attaching a bracket to at least a part of a structure using a securing mechanism, wherein the bracket includes a body, wherein the body is configured to engage with at least a part of a structure, and wherein the body includes an aperture for a fastener; a securing mechanism to secure the bracket to the structure wherein the securing mechanism includes a first and second fastener, wherein the fasteners are configured to engage with each other, wherein the second fastener is also configured to engage with a second aperture of the body, wherein the second fastener and aperture includes a complementary guide and track the method including the steps of:
a) engaging the body of the bracket with at least a part of a structure,
b) inserting the first fastener through the first aperture of the body,
c) engaging the first fastener with the second fastener configured to engage with the second aperture of the body,
d) further engaging the first fastener such that the second fastener moves relative to the first fastener via the guide and track.

A mounting bracket should be understood to mean any device or means for connection to an existing structure such as fence posts, walls or buildings and used for mounting accessories to the structure.

For the purpose of this invention, a structure should be understood to be any components or elements for electric fencing purposes. These include fence posts, standards, walls and any other physical component. Reference shall now be made throughout the remainder of this specification to the structure being a fence post although persons skilled in the art will appreciate that this is not meant to be limiting.

Accessories to be mounted to or by the bracket may include, but is not limited to, fencing wire, insulators, wire strainers, tension sensing devices, fence wire supports, fence wire termination devices and so on. Persons skilled in the art will appreciate that the present invention has many applications and is not limited to use with electric or indeed conventional fencing.

Preferably, the body of the bracket is made of non-conductive material, for example plastics material, such that it is electrically insulated. This is so that it can provide an insulating barrier for the users of electric fence wires. Plastics material is also hard wearing and corrosion resistant.

The body is configured to receive or engage with at least a part of the profile of a fence post.

In preferred embodiments of the present invention, the body is configured with an open ended recess dimensioned to be complementary to a fence post. It will be appreciated that the recess is the portion of the body that engages with the fence post. The shape of the recess may depend on the profile of the fence post with which the invention is to be used. However, it can be useful to have a relatively large recess to allow for the use of the invention with fence posts of varying dimensions and configurations.

In a particularly preferred embodiment, the body has a base and opposing arms extending away from the base in substantially a U-shaped profile, with the arms defining an open recess therebetween and having substantial thickness in each of the arms.

The body includes first and second apertures for the securing mechanism.

In preferred embodiments of the present invention, the apertures are substantially in line with each other in order to allow the fasteners of the securing mechanism to engage with each other linearly.

In a particularly preferred embodiment, the first and second apertures are positioned on the arms of the body and the open ended recess positioned therebetween.

In preferred embodiments of the present invention, the first aperture is simply a smooth passage though a portion of the body.

In preferred embodiments of the present invention, the second aperture includes an internal thread. The term thread should be understood to be a helical structure used to convert rotational movement to linear movement.

In preferred embodiments of the present invention, the body includes retaining means to retain fence wires and any other structure or parts of a component.

In a preferred embodiment, the retaining means are apertures or slots configured to attach other components with a pin such that the components may rotate about the axis of the pin. This is useful as it allows the attached components to be rotated about the pin such that it is in line with the tension force of the fencing wire. The retaining means may also be used to retain fencing wire and any other structure or parts of a component. However, this is not meant to be limiting and the retaining means of the body may come in a variety of configurations depending on the accessory to be mounted by the bracket.

The securing mechanism is understood to be any device, means or mechanism to secure the bracket onto the fence post via a clamping action.

It will be understood that the securing mechanism includes a first and second fastener, wherein the fasteners are configured to engage with each other.

A fastener should be understood to mean any device, means or mechanism that may be used to firmly secure and mount (in some embodiments, rotatably mount), attach or connect one object to another. These include screws, bolts, nuts, bushes, drives, threaded rods, key-in-lock systems and the like.

As discussed above with respect to the apertures of the body of the bracket, the term thread should be understood to be a helical structure used to convert rotational movement to linear movement.

In preferred embodiments, the first fastener has a threaded external body so it can be threaded or screwed into a bore (aperture) in the second fastener. However, it will be appreciated by persons skilled in the art that this arrangement can be reversed depending on the requirements of the user.

In preferred embodiments of the present invention, the first fastener includes a head complementary to a tool such as a screwdriver, spanner or socket. This may be in the form of a slot (for a screw driver) or a hexagonal head (for a socket). Alternatively, the head may be in the form of an anti-tamper head that can only be rotated by a tool in one direction. Rotation in the opposing direction will result in the head slipping or otherwise failing to grip.

In preferred embodiments of the present invention, the head of the first fastener includes an elongate threaded shaft extending there from. It should be understood that this shaft is the threaded external body.

In preferred embodiments of the present invention, the first fastener is a self-tapping screw. It will be understood that a self-tapping screw cuts a thread into what ever it is being screwed into.

It should be appreciated that the head of the first fastener is larger than the first aperture of the body of the bracket. Only the shaft of the first fastener is dimensioned to pass through the first aperture. Thus, the first fastener cannot fully pass through the first aperture.

The second fastener should be understood to be configured with an internal bore (aperture) slightly smaller than the cross-sectional area of the thread of the shaft of the first fastener. It should also be appreciated that the second fastener is configured with a thread about its exterior such that it may be engaged with the second aperture, which is threaded, of the body.

Thus, the second fastener may be thought of as a cylindrical sleeve which is threaded externally, as well as having an internal bore.

The internal bore may run the longitudinal length of the sleeve and therefore has an opening at both ends. However, this is not meant to be limiting, and in some embodiments, the bore may only have one opening. Persons skilled in the art will appreciate that the sleeve may need to be appropriately dimensioned longitudinally to allow for this.

It should be understood that the external threads of the first fastener are threaded in the opposite direction to the external thread of the second fastener. For example, if the first fastener has a right-handed thread, then the external thread of the second fastener will be left-handed. Of course, persons skilled in the art will appreciate that this arrangement may be reversed according to the requirements of the user.

Having the first and second fasteners with opposing external threading is an important aspect of the present invention.

When the threaded shaft of the first fastener engages and moves into the internal bore of the second fastener, cutting a thread into the bore as it does so, until further linear movement is prevented (by the head of the first fastener abutting the periphery of the first aperture of the body), this causes the external thread of the second fastener to engage and rotate about the thread of the second aperture of the body of the fastener.

This effectively rotates and moves linearly the second fastener into the body and at least partially through the second aperture. Thus, a portion of the second fastener enters the open recess of the body of the bracket. This clamps the fence post between the second fastener and the opposite side of the open recess.

In preferred embodiments of the present invention, one end of the second fastener includes a head complementary to a tool such as a screwdriver, spanner or socket. This may be in the form of a slot (for a screw driver) or a hexagonal head (for a socket). It may also be configured such that it can only be rotated in one direction.

Preferably, the second fastener has at least one substantially flat surface to act as a bearing surface when being used to secure the bracket to the fence post. It will be appreciated that in preferred embodiments the flat surface is the other end of the second fastener.

In some embodiments of the invention, a portion of the flat surface may be recessed or otherwise configured to receive a socket. This will allow the use of a tool to undo the bracket using the second fastener.

In use, the body of the bracket will be positioned to engage a part of a structure such as a fence post. In some embodiments, the fence post may be provided with a manufactured aperture therein or the user may need to drill or otherwise create a suitably dimensioned aperture that approximates the dimensions of the diameter of the first fastener.

In these embodiments, the first fastener is then inserted through the first aperture of the bracket, through the aperture in the fence post, and into the second fastener.

However, in other embodiments of the present invention, the depth of the recess of the body of the bracket is such that the entire profile of the fence post fits within the recess. In these embodiments, one side of the fence is proximate the base of the recess and the first fastener passes on the other side of the fence post.

The second fastener has previously been threaded into the second aperture of the bracket. Thus, the first and second fasteners engage each other.

Upon further tightening of the first fastener, and as the head of the first fastener abuts the periphery of the first aperture, no further linear movement of the screw is allowed. Therefore any further forward rotational movement of the screw will cause the external threads of the sleeve to engage with those of the second aperture. Therefore, this action will pull the second fastener towards the first fastener, creating a clamping action due to the opposite direction external thread of the second fastener.

Alternatively, upon tightening of the first fastener into the internal bore of the second fastener, as soon as the frictional force of the connection between the two fasteners become greater than the frictional force between the thread of the second fastener and the internal thread of the second aperture, then the second fastener will rotate and be advanced through the second aperture, moving linearly towards the post. When it abuts the post, it clamps it against the opposing arm of the bracket. The first fastener will continue to advance through the internal bore of the second fastener, cutting a thread as it does so, until the head of the first fastener abuts the periphery of the first aperture. This completes the fixing of the bracket to the fence post.

The surface of the second fastener which is closest to the first fastener acts as a bearing surface for the structure, parts or components that the bracket is intended to be attached to.

Upon further tightening of the first fastener, the second fastener clamps further against the structure, parts or components which creates a rigid, secure and "zero-tolerance" connection between the bracket and the structure, parts of components.

This is particularly useful when the profile of the recess of the bracket does not match exactly with the profile of the structure it is intended to be attached to, or when the brackets need to be attached at different angles to accommodate certain dimensions or layout of the fencing.

The low clearance between the bracket and fence posts minimises or eliminates movement between them.

Enhanced security of the securing mechanism can be achieved though the use of:
security (anti-tamper) screws including shear type heads;
removal of the head of the sleeve;
flame resistance materials;
a rivet in place of the screw.

It can be seen that the present invention has a number of advantages over the prior art. These may include:
proper alignment of the bracket and the structure during installation;
provides a rigid and secure connection between the bracket and posts of varying dimensions;
ease of installation as only one fastener needs to be tightened or loosened;
provides a rigid and secure connection between the bracket and structures due to the large surface area engagement that supports higher compressive loading;
provides a rigid and secure connection between the bracket and structures due to the large shear area engagement that supports higher axial tensile loads;
relatively inexpensive to manufacture;
allows for mounting of fencing accessories to a fence post.

At the very least, the present invention offers the public a useful choice.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
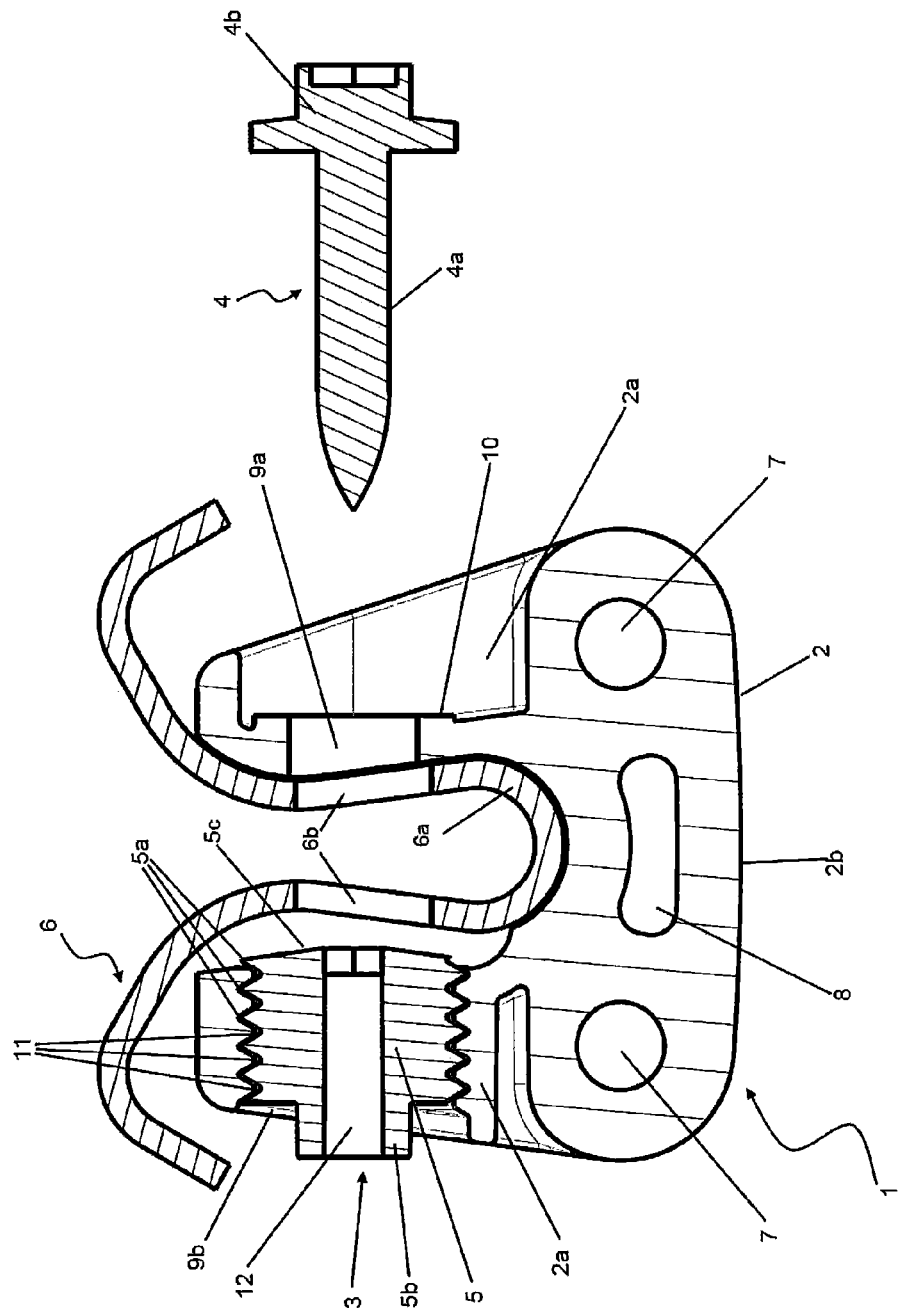
FIG. 1 is a cross-section view of an embodiment of the present invention prior to mounting to a fence post.

The mounting bracket of the present invention (generally indicated by arrow 1) is depicted in FIG. 1 and consists of a body (2) and a securing mechanism (3) in the form of a first fastener (4) and a second fastener (5).

The body (2), formed from plastics material, has a pair of opposing arms (2a) arising from a base (2b) to form a substantially U-shaped open recess. The open recess is intended to engage with a fence post (6) or the like. The fence post includes a portion (6a) substantially complementary to the open recess and apertures (6b) passing through the portion.

The body (2) includes recesses and channels (7) that are dimensioned for use with a pin or similar fasteners to allow attachments, such as fence strainers or the like (not shown), to be mounted to the bracket (1). The invention allows those accessories to be easily integrated into a fencing system.

The bracket (1) is formed using conventional plastic moulding techniques. Some embodiments of the body (2) may include slots (8) or similar constructions to allow for the cooling of the plastics material during the moulding process.

The arms (2a) of the body (2) are provided with opposing apertures (9a, 9b) which are substantially in-line with each other.

The first aperture (9a) is not threaded and is intended to be a passage for the first fastener (4) in the form of a self-tapping screw. However, the aperture is dimensioned such that only the shaft (4a) of the screw may pass through the aperture. The head (4b) of the screw abuts the exterior surface (10) surrounding the periphery of the first aperture.

The second aperture (9b) includes a screw thread (11) which is complementary to that provided on the exterior surface (5a) of the second fastener (5), which is in the form of a sleeve.

One end of the sleeve (5) is provided with a head (5b) with which a suitable tool such as a socket or crescent (not shown) may be used to manipulate the sleeve. The other end of the sleeve (5c) is substantially flat and acts as a bearing surface in use, bearing against the fence post (6) once the bracket (1) has been installed.

The interior of the sleeve (5) is provided with a smooth internal bore (12) that is slightly smaller in diameter relative to the shaft (4a) of the screw (4).

The thread of the screw (not visible) is in the opposite direction to that of the exterior (5a) of the sleeve (5) and the second aperture (9b) of the body (2).

Figure 2:
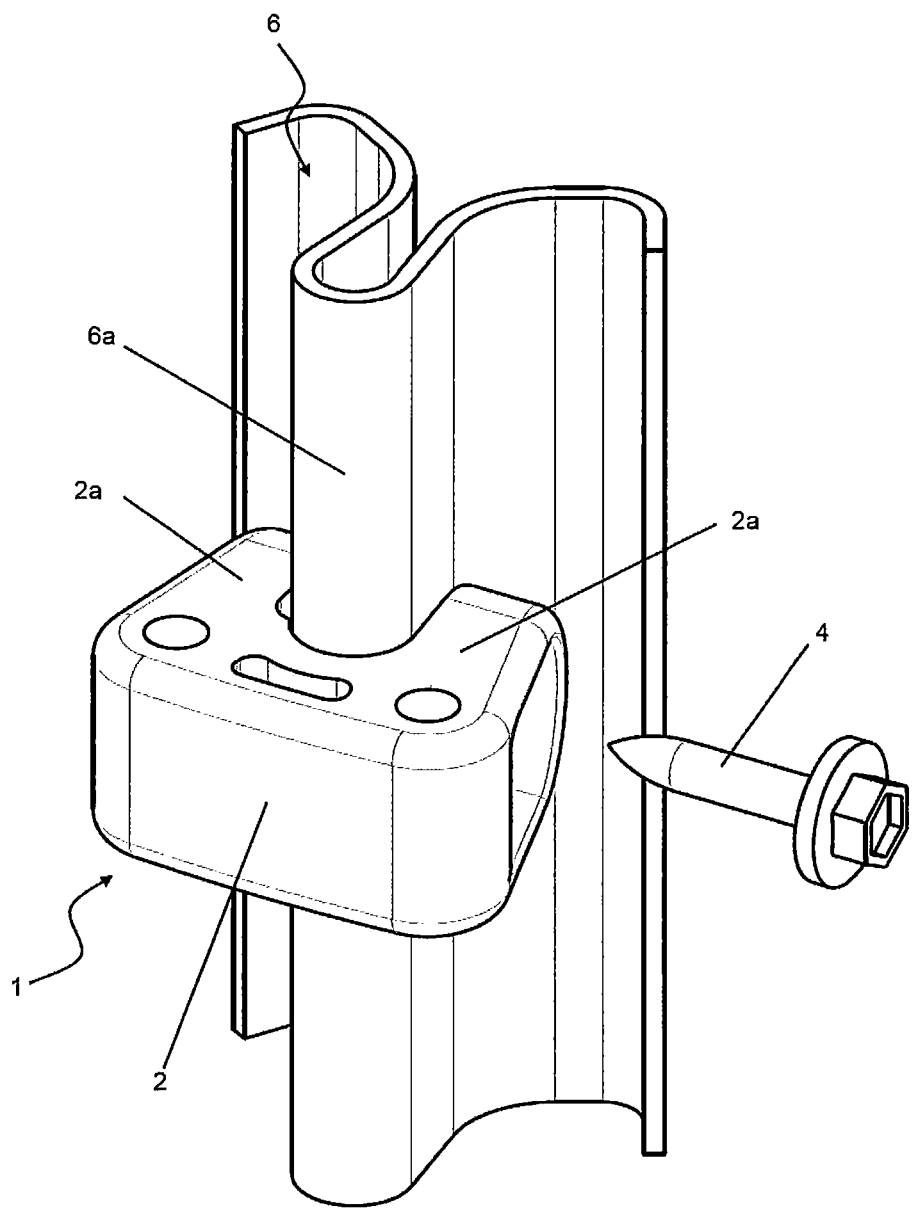
FIG. 2 is an isometric view of the embodiment of FIG. 1 prior to mounting to a fence post.

In use, as shown in FIG. 2, the bracket (1) is offered up to a suitably profiled fence post (6). A portion of the fence post (6a) is inserted into the recess defined by the arms (2a) of the bracket and the screw (4) is offered up to the body (2).

Figure 3:
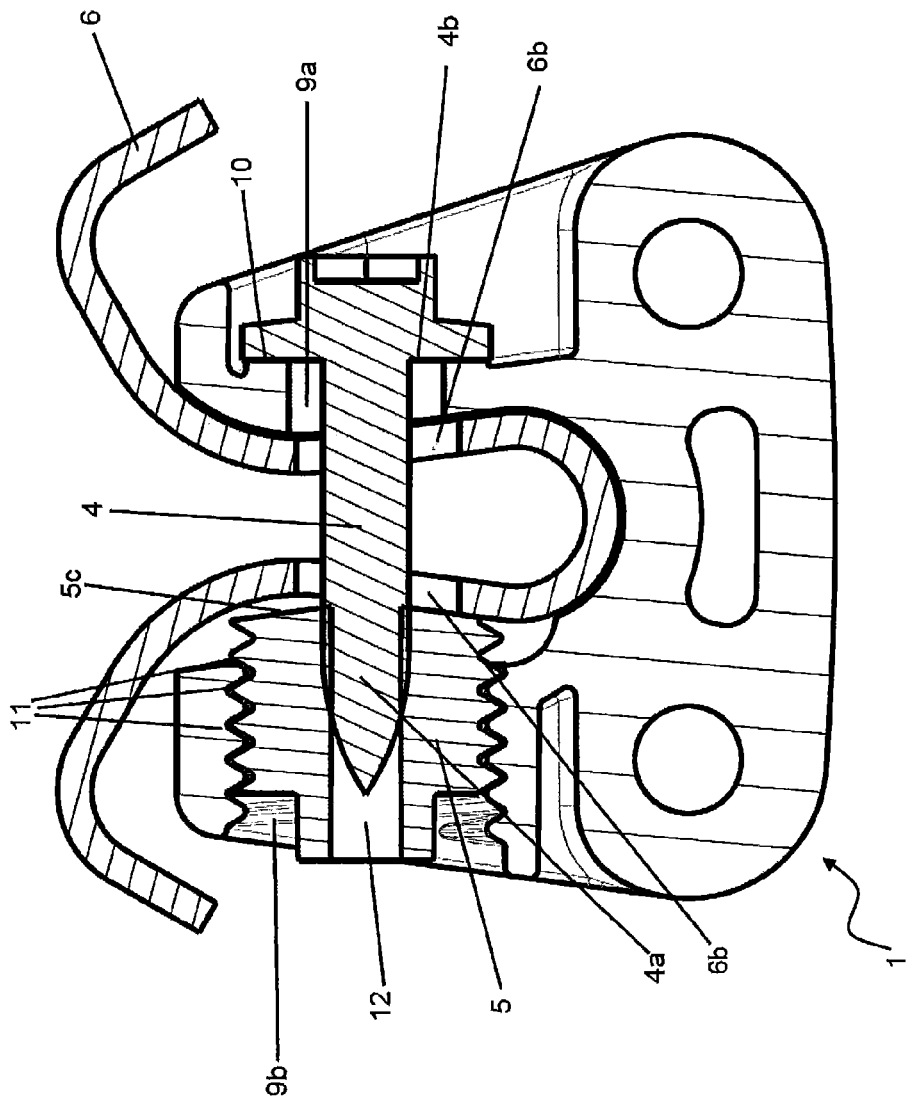
FIG. 3 is a second cross-section view of the embodiment of FIG. 1 mounted to a fence post.

Turning now to FIG. 3, the bracket (1), with the sleeve (5) partially threaded into the second aperture (9b) is secured by passing the screw (4) through the first aperture (9a), the apertures (6b) in the fence post (6), and into the internal bore (12) of the sleeve.

When the screw (4) is rotated, its shaft (4a) moves into the internal bore (12) of the sleeve (5). As it is advanced, the thread (not shown for sake of clarity) of the shaft cuts into the bore. The friction between the screw and the bore starts to increase such that the screw grips the sleeve, which then rotates with the screw. The screw and sleeve effectively becomes a single unit. Because of the threaded exterior (11) of the sleeve, as the screw is rotated, the sleeve moves linearly through the second aperture (9b) until the end (5c) of the sleeve buts up against the side of the fence post (6). This clamps the post against the other arm (2a) of the bracket (1). However, as no further advance of the sleeve is possible (due to the contact with the fence post), the screw will continue to move into the bore if it is further rotated with a force greater than the frictional force between the screw and bore. When the head of the screw (4b) abuts the periphery (10) of the first aperture (9a), the linear movement of the shaft of the screw into the bore of the sleeve ceases.

Figure 4:
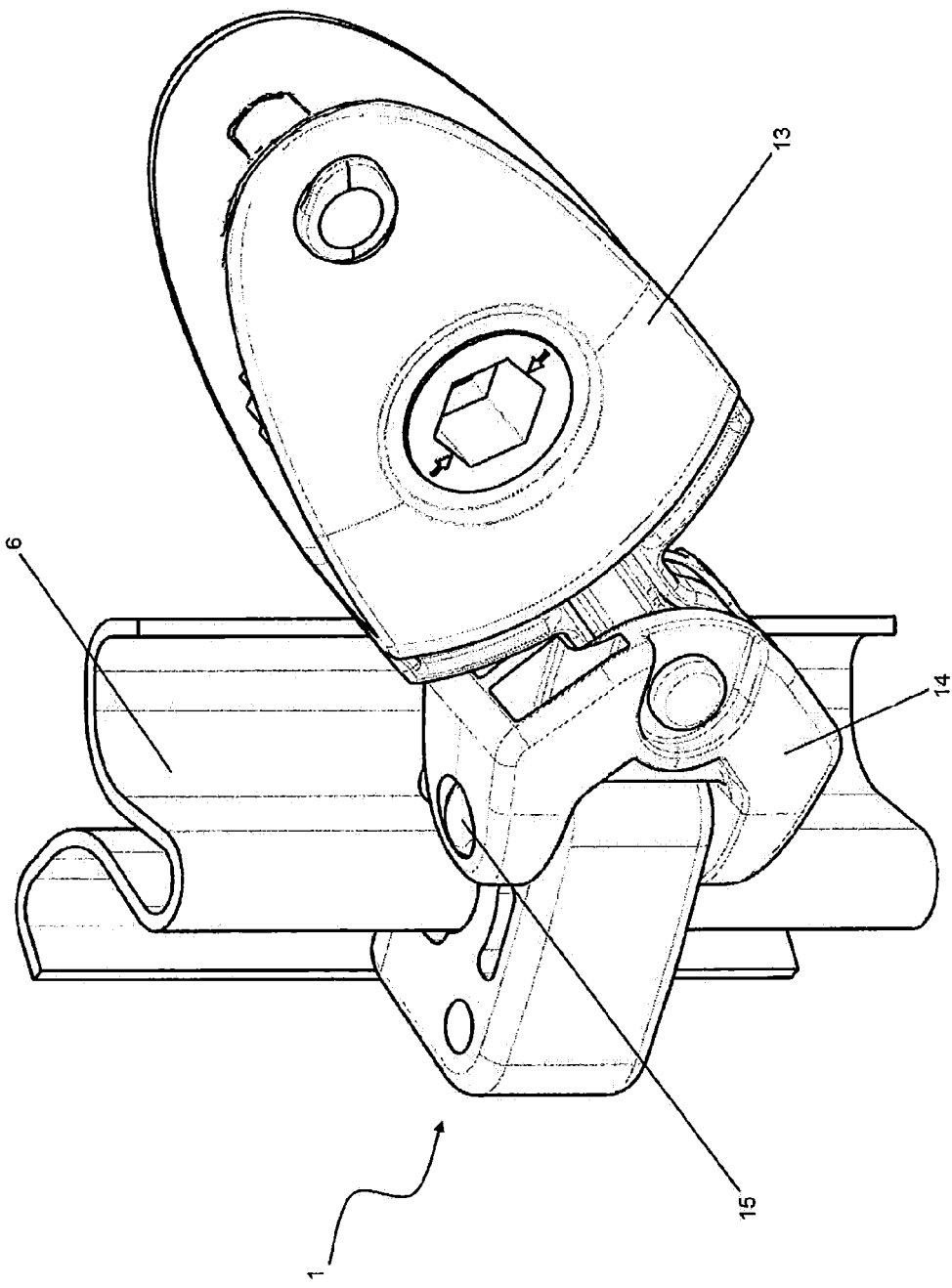
FIG. 4 is a perspective view of the present invention in use.

FIG. 4 shows the bracket (1) in place on the fence post (6). A fencing accessory in the form of a fence tensioner (13) has been attached to the bracket via an intermediary mounting (14). The mounting is attached to the bracket by a pin (15).

The use of the pin (15) allows the mounting (14), and therefore the fence tensioner, to be moveable relative to the fence post (6). Thus, it can be easily aligned with the tension force of the fencing wire (not shown).

Aspects of the present invention have been described by way of example only and it should be appreciated that modifications and additions may be made thereto without departing from the scope thereof as defined in the appended claims.

What we claim is:

1. A mounting bracket, the bracket comprising:
 a body configured to engage with at least a part of a structure; and including an aperture for a fastener;
 a securing mechanism to secure the bracket to the structure;
 the securing mechanism includes a first and second fastener, wherein the fasteners are configured to engage with each other, the second fastener is also configured to engage with a second aperture of the body, the second fastener including a helical screw thread and the second aperture including a complementary guide and track in the form of a co-operating helical screw thread, wherein the securing mechanism moves the second fastener along the complementary guide and track relative to the body to form a compression force between the second fastener and the body.

2. The bracket as claimed in claim 1, wherein the body has an open ended recess configured to receive or engage at least a part of a structure.

3. The bracket as claimed in claim 2, wherein a profile of the recess is configured to match the structure it retains.

4. The bracket as claimed in claim 1, wherein the body has an U-shaped profile.

5. The bracket as claimed in claim 1, wherein the body has a first and second aperture which are in line with each other.

6. The bracket as claimed in claim 1, wherein the body includes retaining means to retain fence wires or any other structures.

7. The bracket as claimed in claim 6, wherein the retaining means are apertures or slots.

8. The bracket as claimed in claim 1, wherein the second fastener has an internal bore.

9. The bracket as claimed in claim 1, wherein the second fastener has an external thread complementary to a thread of the second aperture of the body of the bracket.

10. The bracket as claimed in claim 9, wherein the external thread of the second fastener is threaded in an opposite direction to its internal thread.

11. The bracket as claimed in claim 1, wherein the first fastener has a threaded external body.

12. The bracket as claimed in claim 1, wherein the first fastener includes a head.

13. The bracket as claimed in claim 1, wherein the second fastener includes a head.

14. The bracket as claimed in claim 13 wherein the first aperture of the body is of a diameter that provides clearance for a threaded shaft of the first fastener.

15. The bracket as claimed in claim 8, wherein the internal bore of the second fastener is configured to engage with the first fastener.

16. The bracket as claimed in claim 1, wherein the first fastener is a right-hand threaded screw.

17. The bracket as claimed in claim 16 wherein the second fastener is a sleeve with a left-hand threaded exterior.

\* \* \* \* \*